Jan. 27, 1970   R. L. EDWARDS ET AL   3,491,772
ASH RECEIVER
Filed April 11, 1968

INVENTORS
ROBERT L. EDWARDS
GEORGE F. GIELOW

BY
Oberlin, Maky, Donnelly & Renner
ATTORNEYS

3,491,772
ASH RECEIVER

Robert L. Edwards and George F. Gielow, Mansfield, Ohio, assignors to Artnell Company, Chicago, Ill., a corporation of Delaware
Filed Apr. 11, 1968, Ser. No. 720,675
Int. Cl. A24f 19/14
U.S. Cl. 131—235                                      10 Claims

ABSTRACT OF THE DISCLOSURE

A vehicle seat ash receiver adapted to be mounted on the end of a vehicle seat arm including a container pivotally mounted for rotation about an axis extending longitudinally of the arm with a locked clean-out door, such door being unlocked through the snuffer opening therein.

---

This invention relates generally as indicated to an ash receiver and more particularly to a vehicle seat ash receiver adapted to be mounted on the end of a vehicle seat arm. One of the major problems in vehicle seat maintenance is the removal of the contents of the ash containers which can, for example, be mounted on the end of a vehicle seat arm. If the contents are too easily removed, it may be that the seat occupant will inadvertently discharge the contents. Discharge of the contents must, however, be sufficiently easy that maintenance personnel can complete their assigned tasks in a minimal amount of time.

It is accordingly a principal object of the present invention to provide a vehicle seat ash receiver having a locked clean-out door avoiding inadvertent discharge of the contents by the seat occupant.

Another principal object is the provision of a vehicle seat ash receiver adapted to be mounted on the end of the vehicle seat arm which can be rotated about an axis extending longitudinally of the arm to discharge the contents only after the clean-out door is unlocked and opened.

A further important object is the provision of a vehicle seat ash receiver having a clean-out door which can be unlocked by the insertion of the special key wrench through the snuffer opening in such door.

A further object is the provision of an aesthetically pleasing vehicle seat ash receiver constituting a substantial continuation or terminal end portion of the vehicle seat arm having a normally locked clean-out door which can be opened by the insertion of a key through the snuffer opening in such door.

Other objects and advantages of the present invention will become apparent as the following description proceeds.

The following description and the annexed drawing setting forth in detail a certain illustrative embodiment of the invention, this being indicative, however, of but one of the various ways in which the principles of the invention may be employed.

Figure 1:
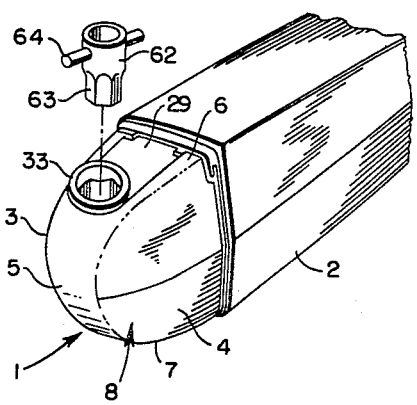
FIG. 1 is a fragmentary perspective view of a vehicle seat ash receiver in accordance with the present invention.
Figure 2:
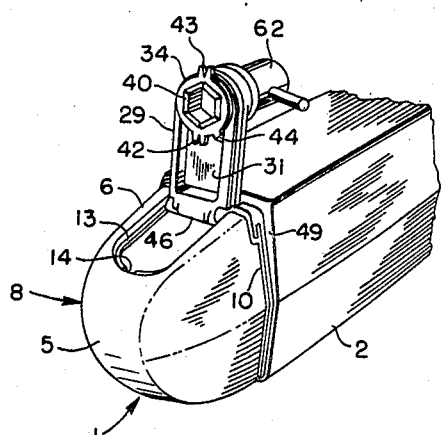
FIG. 2 is a view similar to FIG. 1 showing the clean-out door opened.

Referring now to the annexed drawings and more particularly to FIGS. 1 and 2, it will be seen that the ash receiver shown generally at 1 is mounted on the end of a vehicle seat arm 2 and as indicated comprises a substantial planar continuation of the arm having slightly bowed sides 3 and 4 and a rounded end wall 5 tangent to the top and bottom surfaces 6 and 7, the latter being substantially planar continuations of the top and bottom of the vehicle seat arm.

Figure 3:
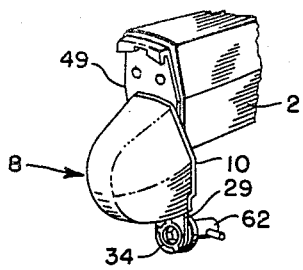
FIG. 3 is a view similar to FIGS. 1 and 2 but on a somewhat reduced scale showing the container of the ash receiver rotated to a discharge position.
Figure 4:
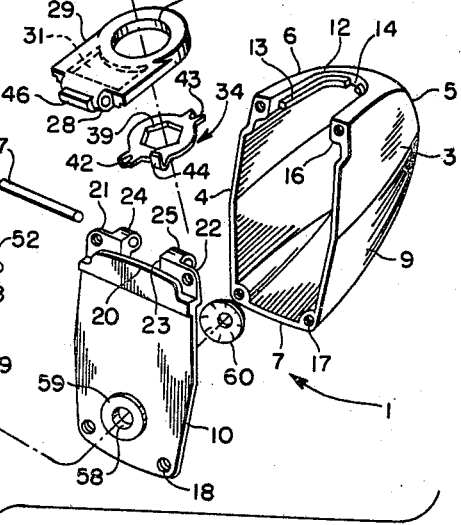
FIG. 4 is an exploded view showing the manner of assembly of the parts of the illustrated embodiment.

Referring now additionally to FIGS. 3 and 4, it will be seen that the ash receiver comprises a container 8 which includes a body shell 9 and a cover and hinge plate 10. The body shell 9 includes in the top surface 6 a U-shape opening 12, the lower inner edge of which is provided with a lip 13 with slot or passage 14 being provided through such lip at the extreme outer end of the opening. The interior corners of the shell body 9 are enlarged as indicated at 16 and each enlargement is provided with a tapped opening 17 with fasteners, not shown, extending through countersunk apertures 18 in cover and hinge plate 10.

Such cover and hinge plate is thus secured to the back of the body shell 9 to form the container 8 and such cover and hinge plate includes at its top or upper end as seen in FIG. 4 a rearwardly offset upwardly projecting tab 20 having a slightly curved top surface. Forwardly spaced from such tab and slightly forwardly offset from the plane of the cover and hinge plate 10 are corner plates 21 and 22 separated by center opening 23. Aligned hinge knuckles 24 and 25 project forwardly from such upstanding plates adjacent the edges of the opening 23.

A hinge pin 27 passes through such hinge knuckles and through hinge boss 28 at the back end of clean-out door 29 hingedly securing the latter to the hinge plate 10. The clean-out door 29 is of the same configuration as the opening 12 in the body shell 9 snugly fitting therein. At its forward end, the clean-out door 29 includes a circular opening 30 and on its underside, as seen in FIG. 2, includes a stop recess 31. Such stop recess includes a circular end wall adjacent to but slightly spaced from the circular opening 30.

A snuffer and lock bushing 33 projects through the opening 30 and is held in place in the clean-out door by lock spring 34. The bushing 33 includes a top lip 35 which seats against the top of the opening 30 and a shank which includes a cylindrical bushing surface 36 and a projecting hex end 37. The cylindrical bushing surface closely fits within the circular opening 30 to permit the bushing to be rotated within such opening. The interior of the shank is provided with a hex configuration indicated at 38.

The hex extension 37 of the shank of the bushing extends through hex opening 39 in the lock spring 34 and is secured thereto by flaring the hex extension as indicated at 40 in FIG. 2. The bushing 33 with the lock spring 34 secured thereto will thus rotate within the aperture 30 in the clean-out door 29. The lock spring includes oppositely directed spring tabs 42 and 43 of a width sufficiently narrow to fit through the slot 14 in the lip 13. The lock spring also includes a stop tab 44 which projects radially from the lock spring and extends axially. Such stop tab fits within the stop recess 31 adjacent the curved surface of such recess near the circular opening 30. The rotation of the bushing and lock spring sub-assembly is thus limited to an arc of approximately 90°. When the stop 44 engages one edge of recess 31, the tab 43 will be aligned with slot 14.

The clean-out door at the hinge boss 28 is provided with a tab 46 which in the assembled condition fits within and projects rearwardly through the opening 23 between the hinge knuckles 24 and 25 on the cover and hinge plate 10. This tab in the closed condition of the clean-out door fits within the notch 47 in the center of downturned flange 48 on the upper end of the back mounting and lock plate 49. The flange 48 forms a downwardly opening groove 50 at the upper end of the plate 49 in which the rearwardly offset tab or tongue 20 on the cover and hinge plate 10 slides. The mounting plate 49 may be secured to the end of the vehicle arm 2 by suitable fasteners, not shown, through the apertures 51. A swing stop pin 52 is mounted in the aperture 53 in the flange 48, such pin engaging the tab 20 to limit swinging movement of the container 8 in one direction.

A mounting pivot pin 55 extends through aperture 56 in boss 57 in mounting plate 49 and also through aperture 58 in boss 59 in hinge plate 10. Spring washer 60 is secured to the projecting end 61 of the pivot pin. Such spring washer 60 provides a tension pressing the bosses 57 and 59 against each other to create a swing resistance or friction so that the container will not unduly freely pivot to its discharge position seen in FIG. 3.

A key wrench 62 having a hex shank 63 with a transverse handle 64 is employed to open and close the clean-out door 29. The hex shank fits closely within the hex bushing and functions to rotate the same together with the lock spring 34 secured to the end thereof. Rotation of the lock spring will align the spring tabs 42 and 43 longitudinally of the opening 12 so that the tab 43 will fit through the slot 14 in the lip 13. In this manner, the door may then be swung open to the position seen in FIG. 2. When the door is opened, the key 46 on the hinge boss 28 pivots downwardly clearing the notch or keyway 47 permitting the entire container now to be swung on its axis indicated at 65 in FIG. 4 extending longitudinally of the seat arm 2. With the clean-out door open, the container may now be swung to its inverted position seen in FIG. 3 for discharge of the ash receiver contents through the clean-out door.

To replace the ash receiver to its in-use position, the container 8 is swung back to its upright position with the tab 20 engaging the stop pin 52. The door 29 is now closed which inserts the key 46 in the notch 47 preventing further rotation of the container about the axis 65. The key wrench is now rotated to rotate the lock spring 34 so that the tabs 42 and 43 move beneath the lip 13 on the opposite sides of the opening 12. In this manner, the clean-out door is firmly held in its closed position. Rotation of the lock spring is, of course, limited by the tab 44 engaging the edges of the stop recess 31. The key is now removed from the snuffer opening provided by the snuffer and lock bushing 33.

It can now be seen that there is provided a vehicle seat ash receiver which can only be opened by a key. When the clean-out door is swung to its open position, the container is only then free to be inverted so that the contents can then be discharged therefrom. In this manner a seat occupant or user of the ash receiver cannot inadvertently discharge the contents.

We, therefore, particularly point out and distinctly claim as our invention:

1. A vehicle seat ash receiver adapted to be mounted on the free end of a seat arm comprising pivot means extending from the end of said arm, a container mounted on said pivot means for inversion to a contents dumping position, a clean-out door in said container, and means responsive to the opening of said clean-out door to unlock said container for inversion.

2. A vehicle seat ash receiver as set forth in claim 1 including a snuffer opening in said clean-out door, a rotatable snuffer bushing journalled therein, and means responsive to the rotation of said snuffer bushing operative to lock and unlock said clean-out door.

3. A vehicle seat ash receiver as set forth in claim 2 including a lock spring mounted on and rotatable with said snuffer bushing, and a radially extending tab on said lock spring, said tab in one rotative position of said snuffer bushing freeing said clean-out door to open.

4. A vehicle seat ash receiver as set forth in claim 3 including stop means limiting rotation of said snuffer bushing and lock spring to approximately 90°.

5. A vehicle seat ash receiver as set forth in claim 1 wherein said receiver comprises a container including a hinge plate and a body shell secured thereto, said clean-out door being hingedly mounted on said hinge plate.

6. A vehicle seat ash receiver as set forth in claim 5 including a projecting key on said clean-out door, a notched flange on the end of said arm, said projecting key fitting within the notch of said flange when said door is closed and said container is in an upright position.

7. A vehicle seat ash receiver as set forth in claim 1 including a lock for said clean-out door, said clean-out door having an apertured snuffer therein, and said lock being adapted to be opened by key means inserted through such apertured snuffer.

8. A vehicle seat ash receiver as set forth in claim 7 wherein said lock includes a rotatable snuffer bushing journalled in said clean-out door, and a lock spring secured thereto and rotatable therewith on the underside of said clean-out door.

9. A vehicle seat ash receiver as set forth in claim 8 including diametrically opposed tabs on said lock spring operative firmly to retain said door in closed position in one rotative position of said lock spring and to permit the door to be opened in another rotative position of said lock spring.

10. A vehicle seat ash receiver as set forth in claim 1 including stop means for said container in an upright position, and means responsive to the closing of said clean-out door to lock said container against inversion.

References Cited

UNITED STATES PATENTS

| 2,652,944 | 9/1953 | Visser | 131—235 X |
| 2,730,106 | 1/1956 | York | 131—235 |

FOREIGN PATENTS

| 24,774 | 1912 | Great Britain. |
| 330,376 | 6/1930 | Great Britain. |
| 539,677 | 2/1956 | Italy. |

JOSEPH S. REICH, Primary Examiner

U.S. Cl. X.R.

131—241; 248—137